Patented Nov. 13, 1934

1,980,539

UNITED STATES PATENT OFFICE 1,980,539

AZO DYE

Werner Lange, Dessau-Ziebigk in Anhalt, and Ulrich Dreyer, Wolfen, Kreis Bitterfeld, Germany, assignors to General Aniline Works, Inc., New York, N. Y., a corporation of Delaware No Drawing. Application April 25, 1933, Serial No. 667,938. In Germany July 7, 1932

16 Claims. (Cl. 260—72)

The present invention relates to new azo dyes which especially are useful for dyeing leather in an acid bath and to the manufacture of these dyes.

We have found that such azo dyes are obtainable when coupling 1.3-dihydroxybenzene or its carboxylic acids with one molecular proportion of 2-nitro-1-amino-4-diazo compound and with one molecular proportion of the same or another diazo or of a diazo-azo-compound. These new azo dyes yield on leather different brown tints according to the selection of the components.

Our dyes are differentiated from similar dyes obtained from 1-nitro-4-diazo benzene and subsequent reduction of the nitro group by a beautiful less reddish tint which red tint is undesired for coloring leather.

Furthermore, our new dyes do not tend to bronze when dyed on leather which is not diacidified and show a better fastness to the action of alkalies.

The following examples illustrate the invention without limiting it to the specific details given therein, the parts being by weight:—

Example 1.—19 parts of 2-nitro-1.4-diaminobenzene hydrochloride are dissolved in 250 parts of water together with 23 parts of formic acid and diazotized with 6.9 parts of sodium nitrite at 0° C. This solution is allowed to run at 0° C. to a solution containing 15.4 parts of 1.3-dihydroxybenzene-5-carboxylic acid, 50 parts of sodium bicarbonate and 100 parts of common salt in 300 parts of water. When coupling has finished, the dye is filtered by suction and redissolved in 1000 parts of water with 22 parts of calcined sodium carbonate. To this solution at 10° C. a solution of 18.6 parts of diazotized 1-amino-4-nitrobenzene-2-sulfonic acid is allowed to run. After 1 hour the solution is warmed to 70° C., then the dye is separated and dried as usual. It forms a dark green powder which yields in water a red brown solution and dissolves in concentrated sulfuric acid with red color. Leather is dyed strongly red brown.

Instead of the 1-amino-4-nitrobenzene-2-sulfonic acid used in the foregoing example as the second diazo component, there may be coupled in the same manner with diazotized sulfanilic acid or a diazotized aminonaphthalene sulfonic acid, such as 1-amino-4-nitronaphthalene-6 or -7 sulfonic acid.

Instead of the 1,3-dihydroxybenzene-5-carboxylic acid there may be used the 1.3-dihydroxybenzene-6-carboxylic acid.

Example 2.—When substituting for the 1-amino-4-nitrobenzene-2-sulfonic acid mentioned in Example 1, 27.7 parts of 4-aminoazobenzene-4'-sulfonic acid, a dye is produced which dissolves in water to a red brown solution and in concentrated sulfuric acid to a violet solution. It dyes leather a somewhat redder tint than that obtained according to Example 1.

Similar dyes are obtained when substituting for the 4-aminoazobenzene-4'-sulfonic acid the corresponding quantity of another aminoazo compound, for instance, the monoazo dye obtainable by diazotizing 2-aminonaphthalene-4,2-disulfonic acid and coupling with 1-aminonaphthalene.

Example 3.—48.4 parts of the dye obtained by diazotizing 1-amino-8-hydroxynaphthalene-3,6-disulfonic acid and coupling with 1,3-dihydroxybenzene, are dissolved in 1000 parts of water and 47 parts of the caustic soda lye of 30% strength. 38 parts of 2-nitro-1.4-diaminobenzene hydrochloride are dissolved with 58 parts of hydrochloric acid of 32% strength in 500 parts of water and diazotized at 0° C. with 13.8 parts of sodium nitrite. The solution of the diazo compound is allowed to run simultaneously with 1000 parts of a caustic soda solution of 14% strength at about 15° C. to the solution of the monoazo dye described above. After stirring for some hours, the dye is separated by addition of common salt and filtered by suction. In the dry state it forms a dark powder which is soluble in water to a red brown solution and in concentrated sulfuric acid to a gray green solution. It dyes leather gray brown tints.

When employing instead of 38 parts of 2-nitro-1,4-diaminobenzene only 19 parts of this compound, a dye is obtained having similar properties. It dyes leather somewhat redder shades.

Instead of 1-amino-8-hydroxynaphthalene-3,6-disulfonic acid there may be employed in the same manner 1-amino-8-hydroxynaphthalene-4,6-disulfonic acid, 2-amino-5-hydroxynaphthalene-7-sulfonic acid or 2-amino-8-hydroxynaphthalene-6-sulfonic acid.

Example 4.—The diazo compound obtainable according to Example 1, of 38 parts of 2-nitro-1,4-diaminobenzene hydrochloride is allowed to run while cooling in a solution of 11 parts of 1,3-dihydroxybenzene containing caustic soda, whereat by simultaneous addition of caustic soda the reaction mixture is kept alkaline until coupling is complete. Then the dye is separated and finished in the usual manner. After drying, it forms a dark powder and dyes leather yellow brown tints.

Instead of 1,3-dihydroxybenzene there may be used the 1,3-dihydroxybenzene-5 or -6 carboxylic acid as the coupling component.

In the appended claims and in the foregoing examples wherever we have indicated that coupling with the 1.3 dihydroxybenzene has taken place at fixed positions on the nucleus, such as in the 4.6 positions, we wish it to be understood that these formulae represent the most probable structural arrangement. However, these dyes may also contain components wherein the coupling has occurred at the other positions, such as in the 2.6 positions.

What we claim is:—

1. The azo dyes which correspond to the general formula:

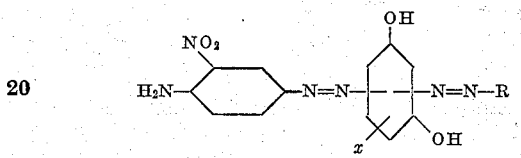

wherein R means a radicle of the benzene or naphthalene series and $x$ means hydrogen or the radical —COOH, said dyes dyeing on leather yellow-brown to brown tints having a good fastness to the action of alkalies.

2. The azo dyes which correspond to the general formula

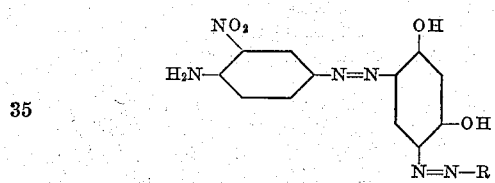

wherein R means a radicle of the benzene or naphthalene series, said dyes dyeing on leather yellow-brown to brown tints having a good fastness to the action of alkalies.

3. The azo dyes which correspond to the general formula

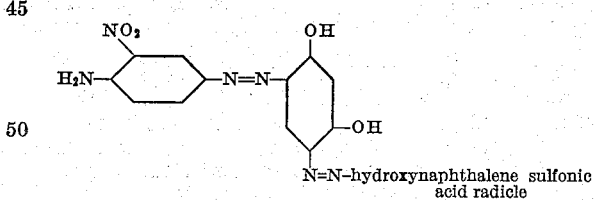

said dyes dyeing on leather yellow-brown to brown tints having a good fastness to the action of alkalies.

4. The azo dyes which correspond as free acids to the general formula

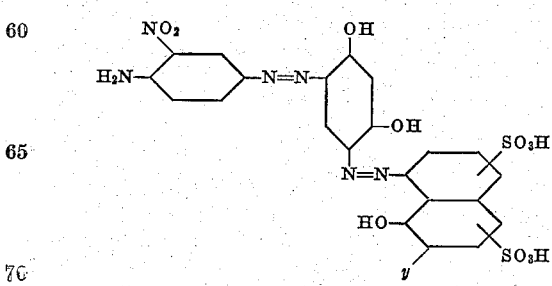

wherein $y$ means H or an azo-nitrophenyl radicle, said dyes dyeing on leather yellow-brown to brown tints having a food fastness to the action of alkalies.

5. The azo dyes which correspond as free acids to the general formula

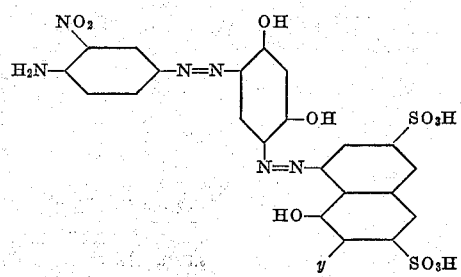

wherein $y$ means H or

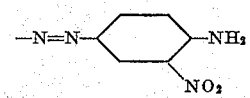

said dyes dyeing on leather yellow-brown to brown tints having a good fastness to the action of alkalies.

6. The azo dye which corresponds as free acid to the formula

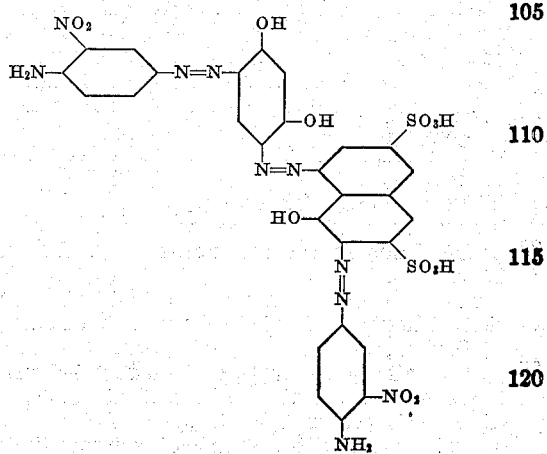

the sodium salt of which forms in the dry state a dark powder which is soluble in water to a red brown solution and in concentrated sulfuric acid to a gray green solution, dyeing leather gray brown tints having a good fastness to alkalies.

7. The azo dye which corresponds as free acid to the formula

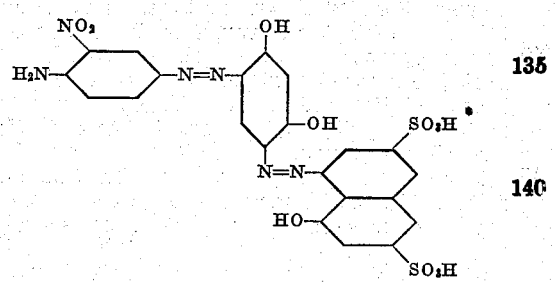

the sodium salt of which forms in the dry state a dark powder which is soluble in water to a red brown solution and in concentrated sulfuric acid to a gray green solution, dyeing leather brown tints, having a good fastness to alkalies.

8. The azo dye which corresponds as free acid to the general formula

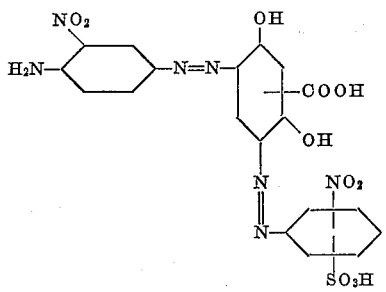

the sodium salt of which forms in the dry state a dark powder which is soluble in water to a red brown solution and in concentrated sulfuric acid to a red solution, dyeing leather gray brown tints, having a good fastness to alkalies.

9. The azo dye which corresponds as free acid to the formula

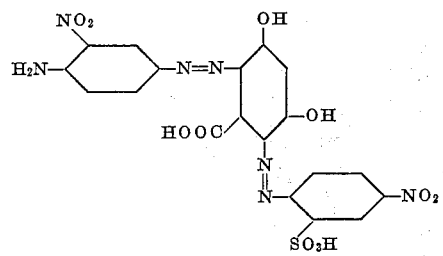

the sodium salt of which forms in the dry state a dark powder which is soluble in water to a red brown solution and in concentrated sulfuric acid to a red solution, dyeing leather brown tints, having a good fastness to alkalies.

10. The process which comprises coupling a compound selected from the group consisting of 1.3-dihydroxybenzene, 1.3-dihydroxybenzene-5-carboxylic acid and 1.3-dihydroxybenzene-6-carboxylic acid with monodiazotized 2-nitro-1.4-diaminobenzene and with a second aromatic diazo compound.

11. The process which comprises coupling 1.3-dihydroxybenzene with a diazotized aminohydroxynaphthalene sulfonic acid and with monodiazotized 2-nitro-1.4-diaminobenzene.

12. The process which comprises coupling 1.3-dihydroxybenzene with a diazotized 1-amino-8-hydroxynaphthalene disulfonic acid and with monodiazotized 2-nitro-1.4-diaminobenzene.

13. The process which comprises coupling 1.3-dihydroxybenzene with diazotized 1-amino-8-hydroxynaphthalene-3.6-disulfonic acid and with two molecular proportions of monodiazotized 2-nitro-1.4-diaminobenzene.

14. The process which comprises coupling 1.3-dihydroxybenzene with a diazotized 1-amino-8-hydroxynaphthalene-3.6-disulfonic acid and with one molecular proportion of monodiazotized 2-nitro-1.4-diaminobenzene.

15. The process which comprises coupling 1.3-dihydroxybenzene carboxylic acid with monodiazotized 2-nitro-1.4-diaminobenzene and with a diazotized aminonitrobenzene sulfonic acid.

16. The process which comprises coupling 1.3-dihydroxybenzene-5-carboxylic acid with monodiazotized 2-nitro-1.4-diaminobenzene and with diazotized 1-amino-4-nitrobenzene-2-sulfonic acid.

WERNER LANGE.
ULRICH DREYER.